US008712557B2

(12) United States Patent
Terae et al.

(10) Patent No.: US 8,712,557 B2
(45) Date of Patent: Apr. 29, 2014

(54) MAINTENANCE TOOL OF CONTROL SYSTEMS

(75) Inventors: Hisashi Terae, Hitachi (JP); Katsuhito Shimizu, Hitachi (JP); Yusaku Otsuka, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 233 days.

(21) Appl. No.: 13/167,749

(22) Filed: Jun. 24, 2011

(65) Prior Publication Data

US 2011/0320014 A1 Dec. 29, 2011

(30) Foreign Application Priority Data

Jun. 25, 2010 (JP) ................... 2010-145285

(51) Int. Cl.
*G05B 19/042* (2006.01)
(52) U.S. Cl.
USPC .............................. 700/17; 726/30
(58) Field of Classification Search
USPC ...................................... 700/17, 89
See application file for complete search history.

(56) References Cited

U.S. PATENT DOCUMENTS

| 5,862,052 | A | * | 1/1999 | Nixon et al. .................. 713/1 |
| 7,272,815 | B1 | * | 9/2007 | Eldridge et al. .............. 717/101 |
| 7,526,347 | B2 | | 4/2009 | Lucas et al. |
| 2010/0023139 | A1 | * | 1/2010 | Ikegami et al. ............... 700/79 |

FOREIGN PATENT DOCUMENTS

| JP | 7-110763 | 4/1995 |
| JP | 7-334213 | 12/1995 |
| JP | 2008-165709 | 7/2008 |
| JP | 2010-33290 | 2/2010 |

OTHER PUBLICATIONS

Mizutani et al., "Automatic Programming for Sequence Control"IAAI'92 Proceedings of the fourth conference on Innovative applications of artificial intelligence. AAAI Press, 1992 pp. 315-331.*
Canadian Office Action for Canadian Application No. 2,743,972, issued on Apr. 5, 2013.
Office Action issued in Canadian Patent Application No. 2,743,972 on Nov. 5, 2013.

* cited by examiner

*Primary Examiner* — Mohammad Ali
*Assistant Examiner* — Emilio J Saavedra
(74) *Attorney, Agent, or Firm* — Antonelli, Terry, Stout & Kraus, LLP.

(57) ABSTRACT

A program editor creates a program-edit screen for a control system based on element data for representing circuit elements and operators and their attribute values. Here, the circuit elements and operators are components of sequential programs which constitute functions of the control system. The program editor which edits the element data on the created program-edit screen judges whether the data for representing the circuit elements and the operators is protected-function data or non-protected-function data and displays assembly sets of programs for implementing predetermined functions constituted by circuit elements and operators to which accesses are authenticated on the program-edit screen in a display mode different from those of the other assembly sets.

9 Claims, 11 Drawing Sheets

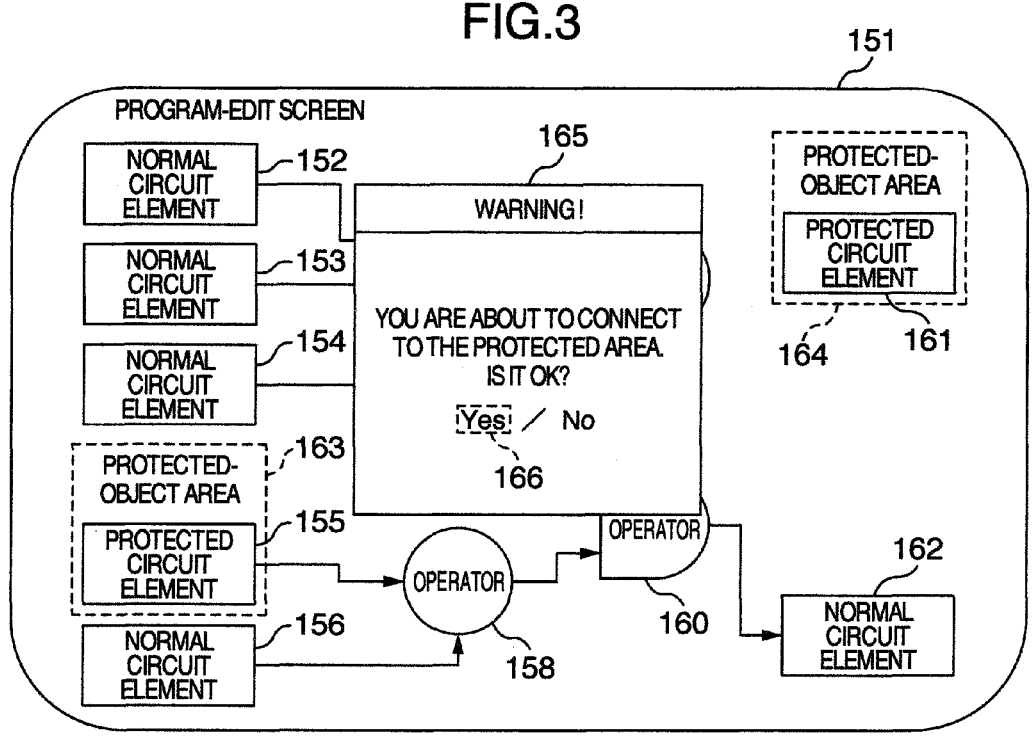
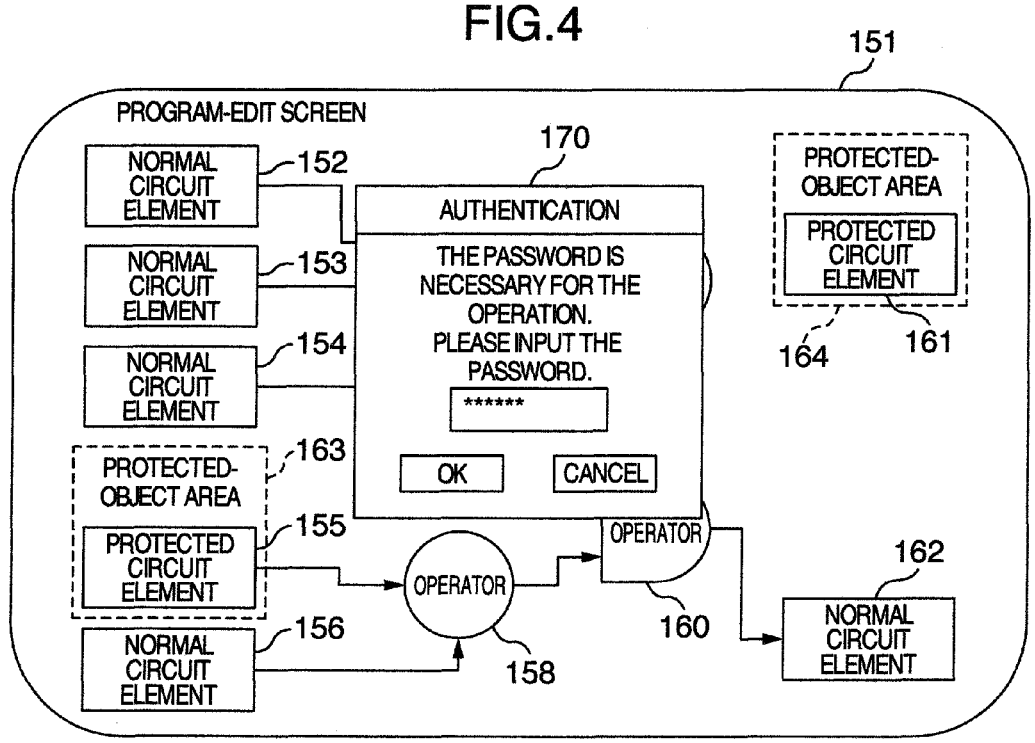

MAINTENANCE TOOL OF CONTROL SYSTEMS

BACKGROUND OF THE INVENTION

The present invention relates to a maintenance tool for a control system. More particularly, it relates to a control-system maintenance tool for ensuring the safety on management side by permitting only users who are authorized to edit a program to perform the program editing.

A method has been known in which a user himself or herself customizes the user interface of an application to give authentication to other users who are permitted to use the program-editing function (JP-A-7-110763 and JP-A-7-334213).

According to this method, the user himself or herself makes it possible to give authentication to other users properly. This feature makes it possible to give authentication to an operator who performs an operation that will yield serious influences on the control system. This authentication allows implementation of the ensuring of the safety on operation side. Also, it is prohibited to display a program to an unauthorized user to whom the authorization to edit this program is not granted whereas the program is displayed only to an authorized user to whom the authorization to edit this program is granted. This feature allows implementation of the ensuring of the safety on management side.

SUMMARY OF THE INVENTION

In a plant control system for controlling a plant such as a power-generation plant and a water-supply/sewage treatment plant, in some cases, the conventional control system may be used with part of it being replaced. Also, in a control system like this, some of its functions are critical and the others are noncritical. In this way, the configuration of the control system is complicated.

In the control system like this, its control functions and human-interface functions are implemented by programs. A critical part of these functions, however, is required to be protected so that this critical part such as, for example, a function for preventing explosion of the system or destruction of facilities associated therewith would not be changed at the time of correcting the programs. Conventionally, this critical part has been separated by being configured using such a device as a solid-state circuit.

In recent years, the critical functions have also been implemented using software. The control system implemented like this turns out to be a control system where a partial component of the software is critical and the other is noncritical.

Then, when users perform operations to the system, information indicating what type of operation should be performed to which part of the complex control system becomes complicated. Also, if there are a lot of transition movements from a certain operating screen to different operating screens, the operations to be performed by the user increase in number and it becomes difficult to grasp the entire situation as a whole. Therefore, it is desirable that the editing-object programs be displayed as many as possible at a time, and that, of the programs displayed, the critical part be explicitly pointed out.

The present invention has been devised in view of these problems; an object of the present invention is to provide a control-system maintenance tool for making it possible to prevent wrong operations from occurring by explicitly pointing out protected functions to users.

In order to solve the above-described problems, in the present invention, the following measure is employed.

There is provided a control-system maintenance tool including a program editor which reads element data for representing circuit elements and operators and attribute values of the element data from data storages, the circuit elements and the operators being components of sequential programs which constitute functions of the control system, creates a program-edit screen for the control system based on the read element data, edits the element data on the created program-edit screen in accordance with an editing input from an input device, and includes a judgment function of judging whether the element data for representing the circuit elements and the operators is protected-function data or non-protected-function data, the control-system maintenance tool displaying assembly sets of a plurality of the circuit elements, operators whose inputs are outputs from these circuit elements, and circuit elements whose inputs are outputs from these operators on the program-edit screen, and displaying assembly sets of programs constituted by circuit elements and operators to which accesses are authenticated for implementing a predetermined function on the program-edit screen in a display mode different from display modes of other assembly sets.

The present invention is provided with the above-described configuration and it becomes possible to prevent wrong operations from occurring by explicitly pointing out protected functions to the users.

Other objects, features, and advantages of the invention will become apparent from the following description of the embodiments of the invention taken in conjunction with the accompanying drawings.

BRIEF DESCRIPTION OF THE DRAWINGS

FIG. 3 is a diagram for illustrating an example of the layout of the program-edit screen;

FIG. 4 is a diagram for illustrating an example of the layout of the program-edit screen;

DETAILED DESCRIPTION OF THE EMBODIMENTS

Figure 1:
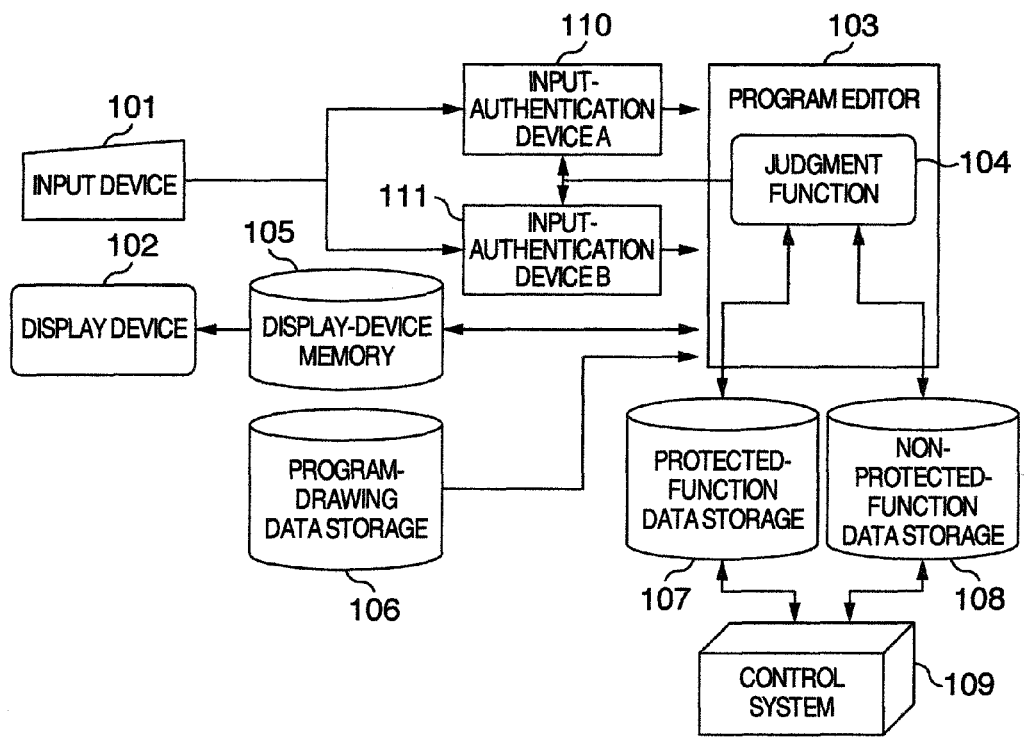
FIG. 1 is a diagram for explaining a maintenance tool for a control system according to an embodiment of the present invention.

Hereinafter, referring to the drawings, the explanation will be given concerning embodiments of the present invention. FIG. 1 is a diagram for explaining a maintenance tool for a control system according to an embodiment of the present invention. As illustrated in FIG. 1, the control-system maintenance tool includes a program editor 103 which is equipped with a function of editing a control program for a control system 109, an input device 101 for receiving an operation from a user, and a display device 102 for displaying, to the user, the state of the program editing and the state of the control system 109.

Data on the control program for the control system 109 and data on the state of the control system 109 are stored into a protected-function data storage 107 or a non-protected-function data storage 108. Of respective functions of the control system 109, the information on their critical part is stored in the protected-function data storage 107 while the information on their noncritical part is stored in the non-protected-function data storage 108.

The data which is to be stored in the protected-function data storage 107 is, for example, data regarding a processing which is one of control process input/output processings for the control system 109 and will exert a significant influence on the control system if this processing gives rise to a malfunction. The data which is to be stored in the non-protected-function data storage 108 is, for example, data regarding a processing which will not exert a significant influence on the control system even if this processing gives rise to the occurrence of some sort of abnormality.

The program editor 103 causes information, which is inputted by the user via the input device 101, to be reflected onto the data whose editing is underway on a display-device memory 105 and to be displayed on the display device 102. Incidentally, the data based on which the control program is created is the data stored in the protected-function data storage 107 or the non-protected-function data storage 108.

At this time, the state existing on the program editor 103 is a state where the data read from the protected-function data storage 107 and the data read from the non-protected-function data storage 108 exist in a mixed manner.

A judgment function 104 in the program editor 103, based on the information such as attribute values read from each of the data storages 107 and 108, judges from which of the data storages 107 and 108 the data whose editing is underway has been read, that is, whether the data is a protected-function data or a non-protected-function data. Moreover, the judgment function 104 displays the attribute values on the display device 102 in a manner which permits the user to make this judgment.

Also, when the input is given from the input device 101, the judgment function 104 judges which data has been edited, the data from the protected-function data storage 107 or the data from the non-protected-function data storage 108. When the data whose editing has been completed is downloaded to the control system 109, the control system 109 will not perform this download erroneously because the edited contents are reflected on the protected-function data storage device 107 and the non-protected-function data storage device 108 in a respective, independent manner.

In FIG. 1, the data stored in the protected-function data storage 107 and the data stored in the non-protected-function data storage 108 are stored in the different physical disks, respectively. These two types of data, however, can also be written into ROMs in the control system 109. In this case, the storage of these two types of data can also be implemented by writing them into a single ROM with their address areas separated from each other.

The data transmitted from the program editor 103 is stored in the display-device memory 105, then being displayed on the display device 102. At this time, in order to make it easy for the user to understand the program visually, the program editor 103 displays the information on the program after transforming it to data for which program-drawing data stored into a program-drawing data storage 106 is used.

When transforming and displaying the program, FBD defined in IEC 61131-3, ST, and SFC languages can be candidates, for example. Then, when the program edited by the user is downloaded to the control system 109, the program is required to be compiled. In this case as well, when the program data created by the user using the program drawing is inversely transformed to the language which can be downloaded to the control system, the program-drawing data storage 106 is also used.

Input-authentication devices A 110 and B 111 authenticate the operations to the program performed from the user. If a certain user has no authorization to edit the program of a protected function, it becomes possible to protect this program by making it impossible for this user to perform this operation. In this case, as methods for authenticating the operation authorization of the user is the use of biometric authentication, password, ID card, and the like. When the user who has no operation authorization tries to edit the protected function, the program editor 103 can take some actions against this operation of the user such as not accepting the operation of the user or issuing a warning to the user via the display device 102.

In this device configuration, the functions are classified into the protected functions and the non-protected functions and both of the functions are provided with their own storages 107 and 108, respectively. The classification of the protection, however, is not limited to this one classification or the configuration of the storages is not necessarily limited to the one configuration for each function. Namely, it is possible to provide plural numbers of classifications of the protection and, in this case, the degree of priority is set for each classification of the protection in advance to allow the program editor to read the degree of priority, thereby enabling the display device to display accordingly. Also, for a function whose protection's degree of priority is high, there will be a significant influence once the information on this function is lost and it is conceivable to provide such a method as redundancy of the disk. Meanwhile, for a function whose protection's degree of priority is low, the low-cost implementation is possible by sharing the disk with other functions.

FIGS. 2 to 5 illustrate examples of the layout of an actual program-edit screen used by the user. On the program-edit screen 151, the data read from the control system 109 is judged so that the user is able to easily judge whether a certain circuit element is a protected circuit element or a normal circuit element which is not protected.

Figure 2:
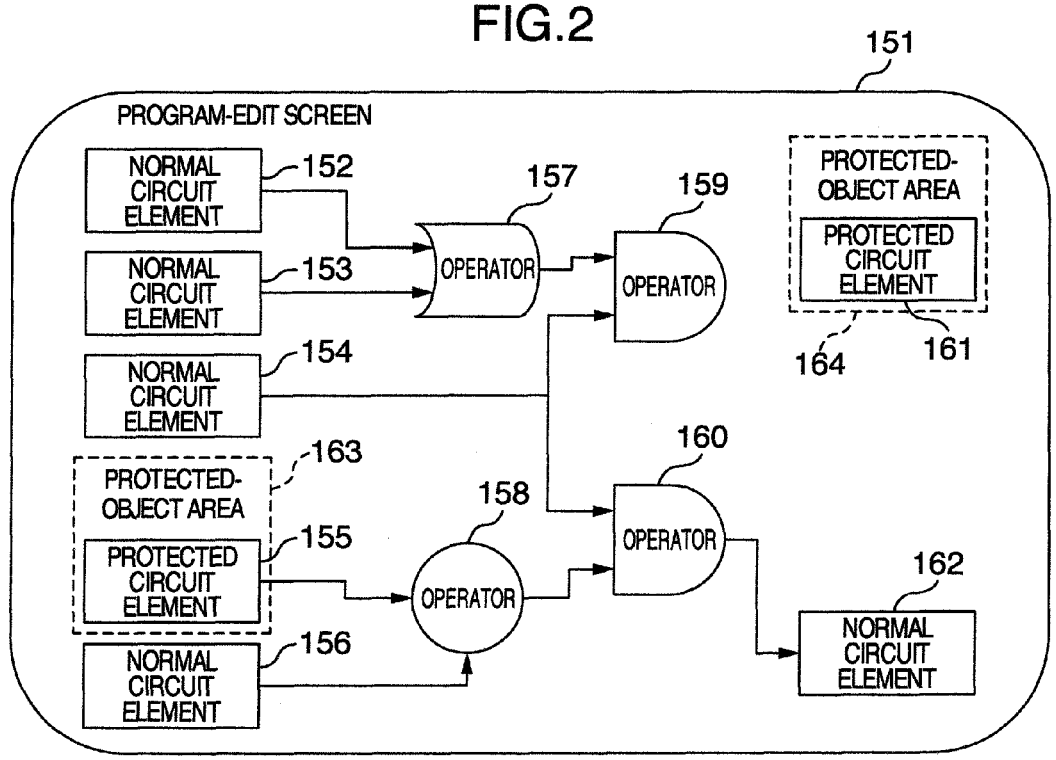
FIG. 2 is a diagram for illustrating an example of the layout of a program-edit screen.

In FIG. 2, the normal circuit elements 152, 153, 154, and 156 are circuit elements corresponding to the non-protected functions in the control system 109 and are not protected. The protected circuit element 155 is a circuit element corresponding to a protected function in the control system 109 and is protected.

Here, operations are to be performed using operators 157 and 159 based on information on the normal circuit elements 152, 153, and 154. The connection destination of the operator 159, however, is not determined yet and this entire circuit is in an incomplete state.

Similarly, operations are to be performed using operators 158 and 160 based on information on the normal circuit elements 154 and 156 and the protected circuit element 155. The result of this operation is stored into a normal circuit element 162 so that the operation of this entire circuit is closed here. Also, there exists a protected circuit element 161 as well, which is not connected to any operator.

In this case, the areas which become objects of the protection are the protected circuit elements 155 and 161. This is because these elements are defined as the protected circuit elements from the beginning. Accordingly, a protected-object area display 163 is displayed for the protected circuit element 155 and a protected-object area display 164 is displayed for the protected circuit element 161 so that the protected objects can be explicitly pointed out to the user.

Next, in FIG. 3, consideration is given to a case where the user performs an operation of establishing a connection between the operator 159 and the protected circuit element 161. In this case, it turns out that the operation is performed to the protected circuit element 161 and a warning-message window 165 is displayed on the program-edit screen 151 when the operator 159 is connected to the protected circuit element 161. In this warning message window, as is illustrated in FIG. 3 for example, it is conceivable to display a message such as "You are about to connect to the protected area. Is it OK?". Otherwise, it is also conceivable to provide a scheme such as transitioning to a password-input screen. Simultaneously, a cursor 166 is displayed within the warning-message window 165 so that the user can make an input of the confirmation.

In FIG. 4, unlike FIG. 3, the password-input screen 170 is displayed. The user is permitted to perform the operation to the protected-object area by inputting a correct password into the password-input screen 170. If there exist a plurality of protected-object areas, different passwords can be allocated to the respective protected-object areas so that it is possible to grant different operation authorizations to the plurality of protected-object areas.

Figure 5:
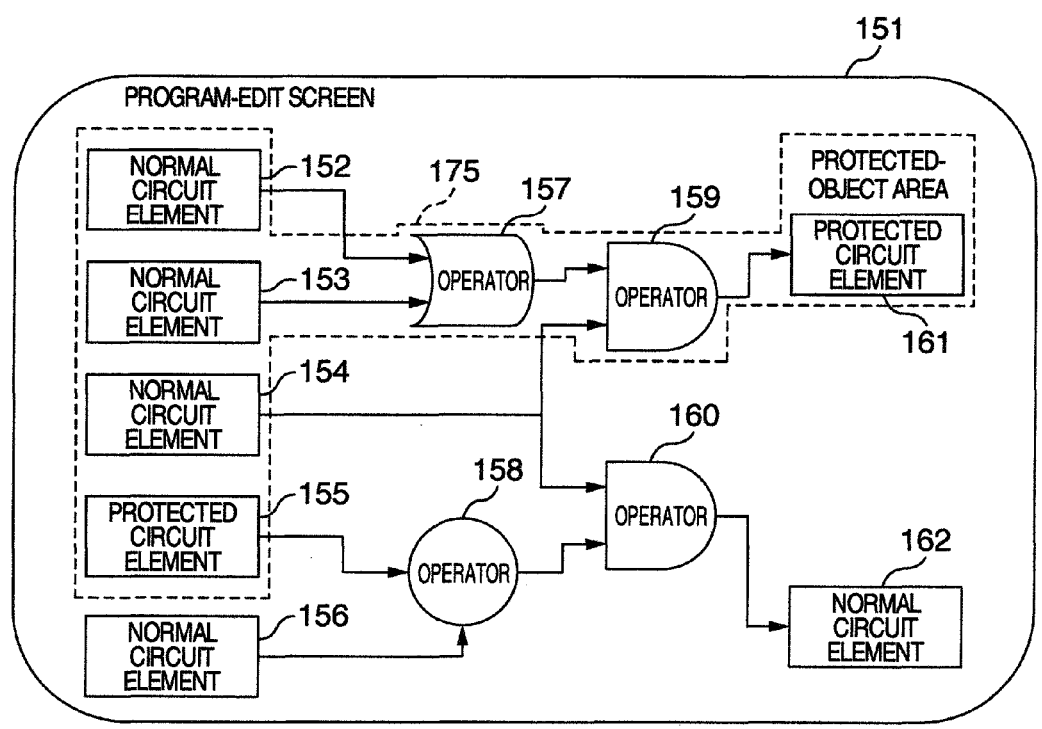
FIG. 5 is a diagram for illustrating an example of the layout of the program-edit screen.

FIG. 5 illustrates the state which appears after the user has selected "Yes" in FIG. 3 or after the user has inputted the correct password in FIG. 4. At this time, the state of the protected-object areas changes from their state illustrated in FIG. 2.

In FIG. 5, the operators 157 and 159 and the normal circuit elements 152, 153, and 154, whose information becomes the source of the operations, store the result of this operation into the protected circuit element 161. Therefore, if some sort of unauthorized manipulation exists in the middle of the operations in these circuits, the value stored into the protected circuit element 161 becomes an unauthorized value. Therefore, all of the circuits connected to the protected circuit element 161 are displayed to the user as protected objects.

Also, the operators 158 and 160 and the normal circuit elements 154 and 156 and the protected circuit element 155, whose information becomes the source of the operations, store the results of the operations for the normal circuit element 162. In this case, the operation results for the normal circuit element are stored and the circuits in the middle of operations do not become protected objects. The normal circuit element 154 is, however, needed to become a protected-object area because it is also used for the operation in the protected circuit element 161.

Further, the protected circuit element 155 is also needed to become a protected-object area because it is defined as the protected circuit element from the beginning. Consequently, the objects included in a protected-object area 175 turn out to be the normal circuit elements 152, 153, and 154, the protected circuit element 155, the operators 157 and 159, and the protected circuit element 161.

Incidentally, in the present embodiment, a protected-object area is displayed on the screen such that this area is surrounded by a dotted line. As another display method other than this, the corresponding portion may be enclosed by a line and displayed with its background color changed. In this method of explicitly pointing out the area using its background color, the display is implementable not only in the case of protected/non-protected (i.e., prioritized/non-prioritized) but also when there are plural numbers of types of the protection. At this time, if the areas are overlapped with each other, the background colors of the respective areas can be made translucent so that the user can see the area overlapped under another area.

Figure 6:
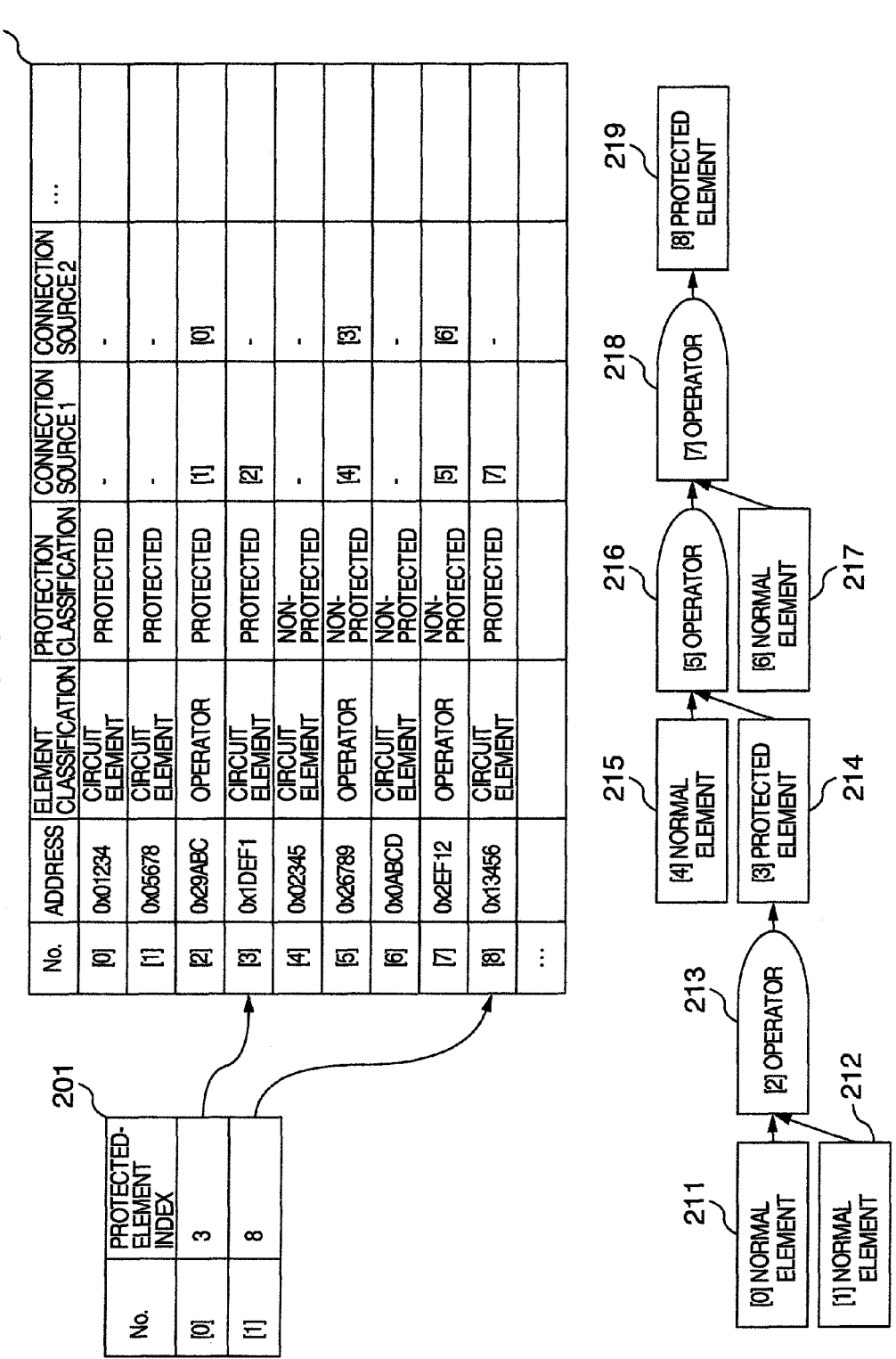
FIG. 6 is a diagram for illustrating the data structure for displaying protected-object areas.

FIG. 6 illustrates the data structure for displaying the protected-object areas. When the user newly adds a circuit element or an operator to the screen, the user registers its information into an array 202. The information to be registered into the array 202 are the address of a circuit element or an operator to be registered, element classification (circuit element or operator), protection classification (protected or non-protected), and indexes of elements of the connection sources. The connection sources refer to other elements which are supposed to enter into the element as its inputs. Since, in the present embodiment, the simple operations such as AND and OR are assumed, the total number of the connection sources is set at two. Even if, however, there is the total number of two or more, the registration and operation methods remain the same.

Also, an element which is classified into a protected circuit element is registered into an array 201 separately from the array 202. This array 201 is an array into which only protected circuit elements are to be registered. The content to be registered therein is the index of the array 202 of protected circuit elements registered into the array 202. Whether or not an element is a protected circuit element is distinguished by the first bit of the address. An element is a normal circuit element if the first bit is "0", is a protected circuit element if the first bit is "1", and is an operator if the first bit is "2". Namely, when a protected circuit element is added, if the first bit of the address is "1", its information is registered into the array 202 and, after that, the index with which the protected circuit element is registered into the array 202 is registered into the array 201 as well. Displaying the illustrated array 202 as a diagram yields the illustration of the elements 211 to 219.

Figure 7:
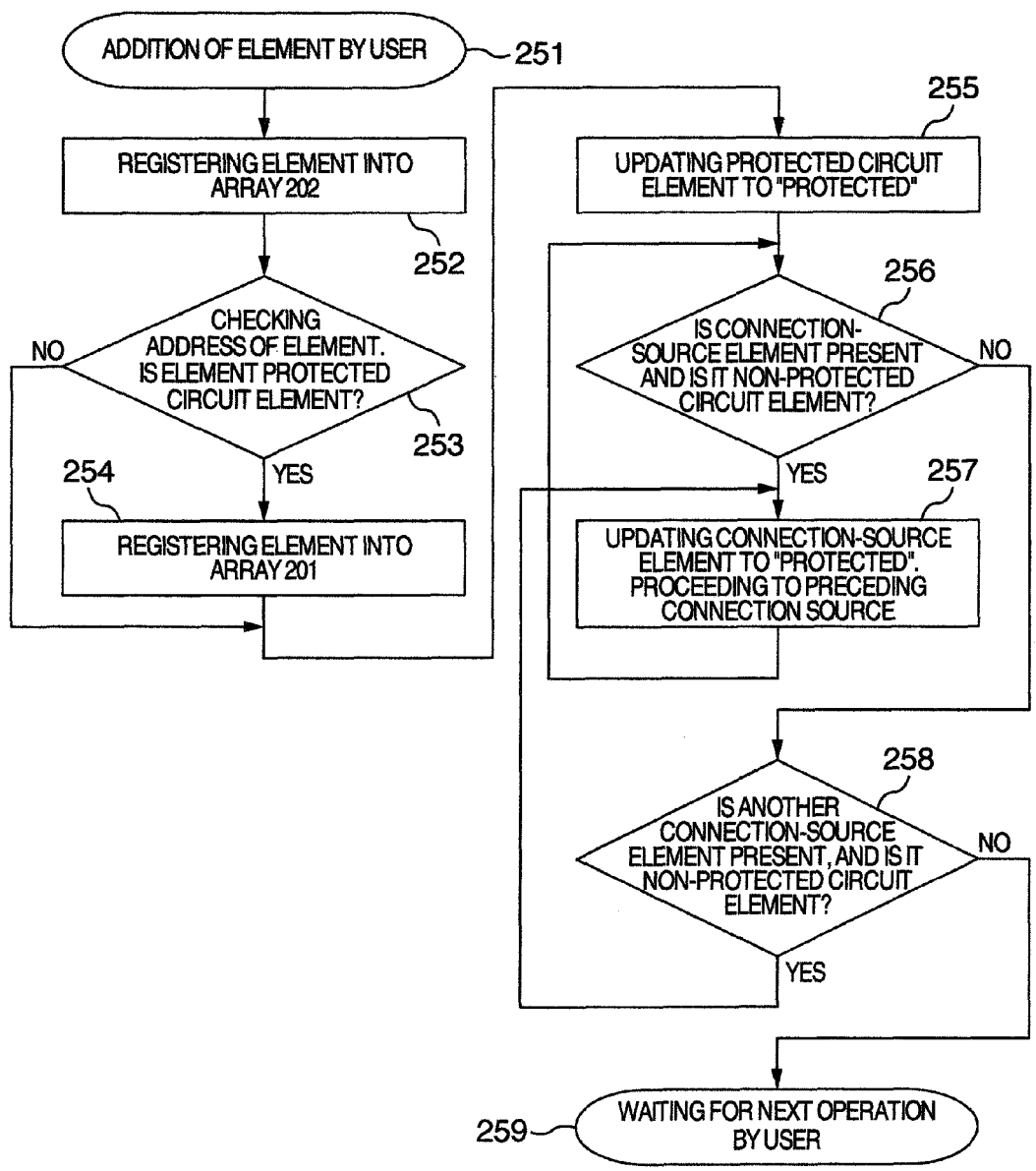
FIG. 7 is a diagram for explaining a method for determining the protected-object areas.

FIG. 7 is a diagram for explaining a method for determining the protected-object areas. Here, the explanation will be given below concerning a case where the user adds the element 219 on the screen and connects it to the element 218. At the step 251, the user adds the element 219 on the screen. At the step 252, the content updated by the user is registered into the array 202. Since the [8]-th element of the array 202 is NULL, the content is registered therein. The example illustrated in the drawing is a new addition of an element. An actual operation performed by the user is, however, an addition or a deletion of an element or a connection line, a change in the address, and so on.

Next, at the step 253, the address of the registered element 219 is checked, thereby judging whether or not this element 219 is a protected circuit element. Since the element 219 is a protected circuit element, at the step 254, the element 219 is registered as a protected circuit element into the array 201 as well. Here, if the element to be added is not a protected circuit element, the registration into the array 201 is not performed.

From here, a processing will be performed which recursively follows connection sources so as to update the protection classification. At the step 255, the protection classification of the protected circuit element in the array 202 is updated to "protected". After the element 219 is updated to a protected circuit element, at the step 256, elements which are the connection sources of the element 219 are searched for. The element connected to the element 219 is the element 218, the protection classification of which is specified as being "non-protected"; at the step 257, the protection classification of the connection-source element 218 is updated to "protected". Next, connection sources of the element 218 are searched for. Then, at the step 256 again, the element 216 and the element 217 are present as the connection sources this time and from the element 216 first, its protection classification is updated to "protected". The element 216 is connected to the element 214 and the element 215 and the processing returns to the step 257, at which the protection classification of the element 215 is also updated to "protected". Since the element 215 has no connection sources, the processing leaps from the step 256 to the step 258, thereby returning to the element 216. The element 214, which is the other connection source of the element 216, is classified into the protection classification and the processing will not follow connection sources further than there. This is because the element classified into the protected classification and the connection sources which are preceding to this element have already been classified into the protected classification. Namely, the element 214 has already been followed to the element 213, which is the connection source of the element 214, and the elements 212 and 211, which are the further connection sources, and an operation of updating these elements to the protection objects has been conducted. After returning from the element 214 to the element 216, the processing returns from the recursive processing to the element 218 because there are no non-protected circuit elements in the connection sources of the element 216. At the step 258, the element 217 is updated to "protected" because the element 218 has the element 217 as its connection source in addition to the element 216. After updating the element 217, the processing returns to the element 218 and the element 219. When there are no more elements to update, the processing is terminated and at the step 259, the user's next operation is waited for.

Figure 8:
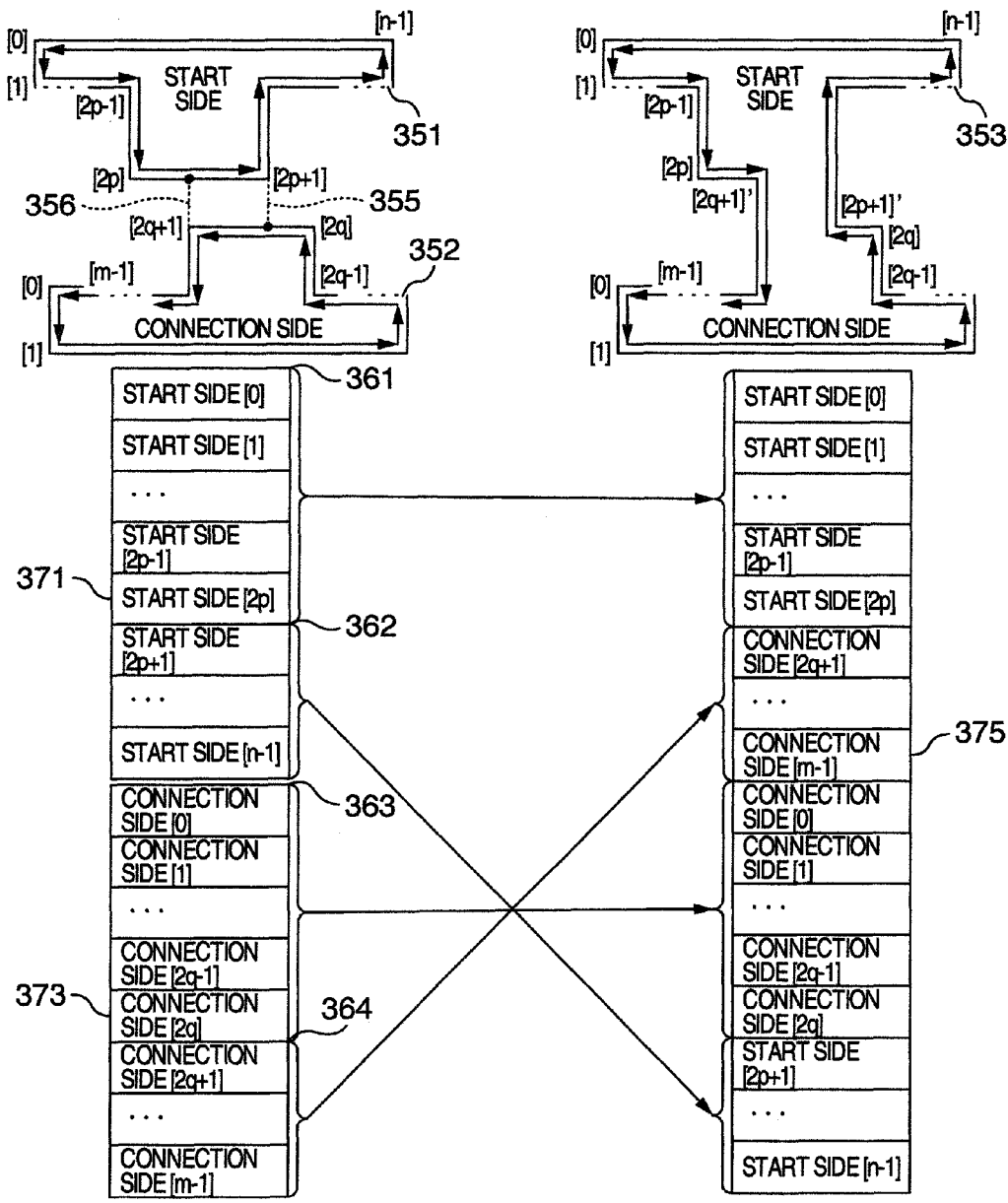
FIG. 8 is a diagram for explaining a display processing for visually combining the protected-object areas to each other.

FIG. 8 is a diagram for explaining a display processing for making the protected-object areas look combined to each other visually. In the present embodiment, a protected-object area is generally a polygon which is constituted only from vertical lines and horizontal lines. No mention will be made regarding a polygon which includes lines other than vertical lines or horizontal lines.

In order to draw a polygon on the screen, the coordinates of each vertex of the polygon are passed to a polygon graphics-drawing function as an argument in the form of an array. Accordingly, hereinafter, as a method for implementing the graphics-drawing of the polygon representing the protected-object area on the screen, the explanation will be given concerning an operation of the arrays which are to be passed to the polygon graphics-drawing function as the argument.

In the present embodiment, if there exist a plurality of protected-object areas, these protected-object areas are represented as, basically, a single protected-object area by combining these protected-object areas to make them easy to see visually. In order to combine two polygons, first, sides of the polygons, which are the most proximate to each other and are mutually opposed to each other, are found. Next, two perpendicular lines are drawn down to overlapped sides of these two mutually-opposed sides. Finally, the two polygons are combined together by defining these two perpendicular lines as new sides.

However, only the distance between the mutually longitudinal sides or only the distance between the mutually transverse sides is calculated and the distance between a longitudinal side and a transverse side is not calculated. Also, a combination where the two sides are not mutually opposed to each other is excluded beforehand. In order to simplify the search, the order in which the coordinates are stored for each vertex of each polygon is set so that a longitudinal side is drawn from start coordinates and sides subsequent thereto are continuously drawn in a counterclockwise direction such as a transverse side, a longitudinal side, a transverse side, . . . .

Hereinafter, based on FIG. 8, the explanation will be given. The indexes of the two transverse sides to be combined together are denoted by p and q in the start-side polygon and the connection-side polygon, respectively. In the following explanation, each vertex of each polygon is represented by the index of the array into which the coordinates of vertexes are stored. For example, if a certain set of coordinates is stored into the [2p]-th element of the array, its set of coordinates is represented by $(X_{2p}, Y_{2p})$. Also, the side between the coordinates $(X_{2p}, Y_{2p})$ and the coordinates $(X_{2p+1}, Y_{2p+1})$ is represented by ([2p], [2p+1]). At this time, the reason why the index of the transverse side is multiplied by 2 is because the total number of the longitudinal sides or the transverse sides becomes half of the number of the elements of the array.

Assuming as a result of search the most-proximate two sides of the two polygons 351 (start side) and 352 (connection side) to be combined together are found to be the transverse side ([2p], [2p+1]) of the start-side polygon 351 and the transverse side ([2q], [2q+1]) of the connection-side polygon 352.

Regardless of whether the two sides are the longitudinal sides or the transverse sides, the two most-proximate sides are mutually opposed to each other and by exchanging the coordinate values with the values on the opposed sides, it becomes possible to draw the two perpendicular lines down to the opposed sides.

The two polygons are combined together by connecting the perpendicular line 355 from the start-side polygon 351 to the connection-side polygon 352 and connecting the perpendicular line 356 from the connection-side polygon 352 to the start-side polygon 351.

First, the comparison of the magnitude correlation is made among the x-coordinate values of the vertexes $(X_{2p}, Y_{2p})$, $(X_{2p+1}, Y_{2p+1})$, $(X_{2q}, Y_{2q})$, and $(X_{2q+1}, Y_{2q+1})$ of the two transverse sides. The comparison result of the magnitude correlation in this case is $X_{2p}<X_{2q+1}<X_{2p+1}<X_{2q}$. Next, the two perpendicular lines are drawn down to the opposed sides from the coordinates which correspond to the second and the third in the comparison result and the destination points to which the two perpendicular lines are drawn down are defined as the new coordinate points, then being stored into the array. As a result, the vertexes of the two sides turn out to be $(X_{2p}, Y_{2p})$, $(X_{2p+1}, Y_{2q})$, $(X_{2q}, Y_{2q})$, and $(X_{2q+1}, Y_{2p})$, respectively.

Next, the explanation will be given below concerning the operation of the arrays. Here, the array which represents a polygon goes around the respective vertexes of the polygon and connects to the first vertex again. Consequently, the [0]-th element and the last [m−1]-th element of the array constitute a side, which is basically the same as the other sides.

With respect to the start point, the comparison is made between the x-coordinate values of the start points of the two polygons, that is, the first elements of the arrays, and the polygon associated with the smaller x-coordinate value is defined as the start-side polygon.

First, starting at the first element of an array 371, which is an element of the start-side polygon 351, coordinates are stored into a array 375 from the beginning, where the array 375 is a combined array. Then, once the array is stored up to a subset array 361, the [2q+1]-th element of the connection-side polygon 352 is stored into the array 375 via the perpendicular line 356. The coordinate value of this [2q+1]-th element is transformed when the perpendicular line 356 is drawn down. Furthermore, after a subset array 364 is stored into the array 375, the remaining portions of the connection-side polygon 352, that is, elements from the [0]-th element of the array 373, are stored into the array 375. Since the [m−1]-th element and the [0]-th element of the polygon are connected to each other by a side, this side can be addressed in accordance with basically the same manner as other sides. After the subset array 363 is stored into the array 375, the [2p+1]-th element of the start-side polygon 351 is stored into the array 375 via the perpendicular line 355. The coordinate value of this [2p+1]-th element is transformed when the perpendicular line 355 is drawn down. All of the elements of a subset array 362 are stored into the array 375. Then, the combined array 375 which represents a combined polygon 353 is created.

The combined-array creating steps until here are basically the same not only in the transverse sides but also in the longitudinal sides. Also, even if the position relationship between the sides is a one other than the above-described position relationship, the storing method of the array for creating the combined array remains the same.

Figure 9:
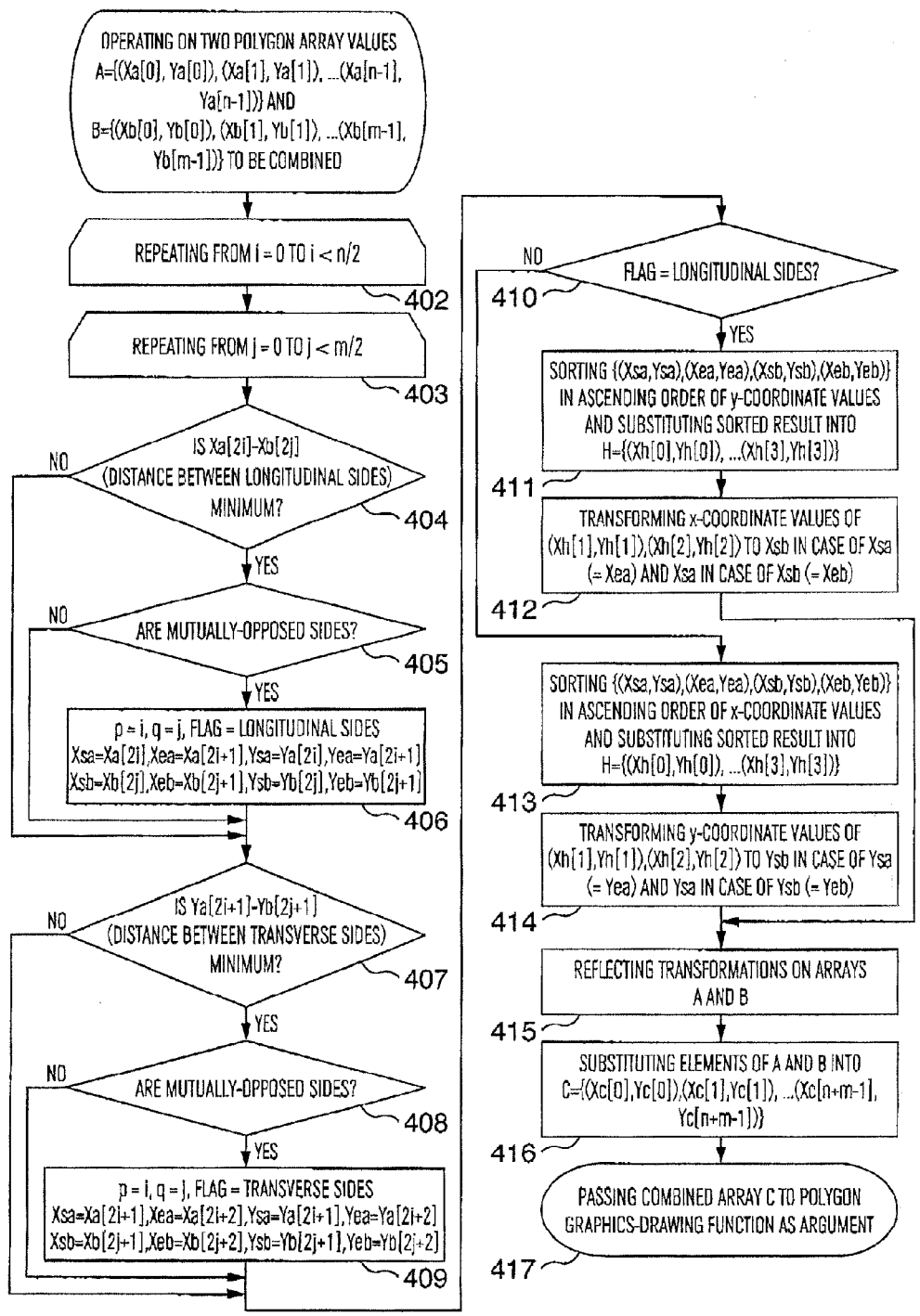
FIG. 9 is a diagram for explaining a method for creating a combined array.

FIG. 9 is a diagram for explaining the method for creating a combined array. Hereinafter, the explanation will be given concerning two polygons which are to be combined together with the arrays A={(Xa[0], Ya[0]), (Xa[1], Ya[1]), ... (Xa[n−1], Ya[n−1])} and B={(Xb[0], Yb[0]), (Xb[1], Yb[1]), ... (Xb[m−1], Yb[m−1])}. First, in order to find two sides ([sa], [ea]) and ([sb], [eb]) which become the most-proximate between the two polygons, at the steps 402 and 403, the comparison is made between the respective elements of the two arrays A and B. Since the check is made regarding each side, the ranges fall into 0<i<n/2 and 0<j<m/2. At the step 404, the distance is calculated between the longitudinal side of the polygon represented by A and the longitudinal side of the polygon represented by B and it is judged whether or not this distance is a minimum value. If this distance is the minimum value, the processing then proceeds to the step 405 and it is judged whether or not these longitudinal sides are mutually opposed sides. If it can be judged that these longitudinal sides are the mutually opposed sides, the processing proceeds to the step 406 to update the data of these two longitudinal sides. If, at the steps 404 and 405, the conditions are not satisfied, the step 406 is not executed. Next, at the steps 407, 408, and 409, the processings are executed similarly regarding the transverse sides as well. Getting out of the loop, at the step 410, the processing is conditionally-branched depending on whether the most-proximate two sides are the longitudinal sides or the transverse sides. If they are the longitudinal sides, at the step 411, four coordinate values (Xsa, Ysa), (Xea, Yea), (Xsb, Ysb), and (Xeb, Yeb) of the vertexes of the most-proximate two sides ([sa], [ea]) and ([sb], [eb]) are sorted in an ascending order with respect to the y-coordinate values. In the result of the sorting, at the step 412, an operation of transforming the x-coordinate values of the second and the third is performed as to make to Xsb in the case of Xsa (=Xea) and to Xsa in the case of Xsb (=Xeb). On the drawing, this operation is equivalent to the operation that the perpendicular lines are drawn down to the opposed sides. Meanwhile, if the most-proximate two sides are the transverse sides, the processing is conditionally-branched from the step 410 to the steps 413 and 414. At the step 413, the four coordinate values (Xsa, Ysa), (Xea, Yea), (Xsb, Ysb), and (Xeb, Yeb) of the vertexes of the two most-proximate sides ([sa], [ea]) and ([sb], [eb]) are sorted in an ascending order with respect to the x-coordinate values. In the result of the sorting, at the step 414, an operation of transforming the y-coordinate values of the second and the third is performed as to make to Ysb in the case of Ysa (=Yea) and to Ysa in the case of Ysb (=Yeb). After the operations up to the step 412 and the step 414, at the step 415, the same coordinate transformation is performed to the initial arrays A and B as well. At the step 416, the elements of the arrays A and B are stored into a combined array C. The storing method is as explained in FIG. 8. Then, at the step 417, a polygon is drawn by passing the created array to the polygon graphics-drawing function as the argument.

Figure 10:
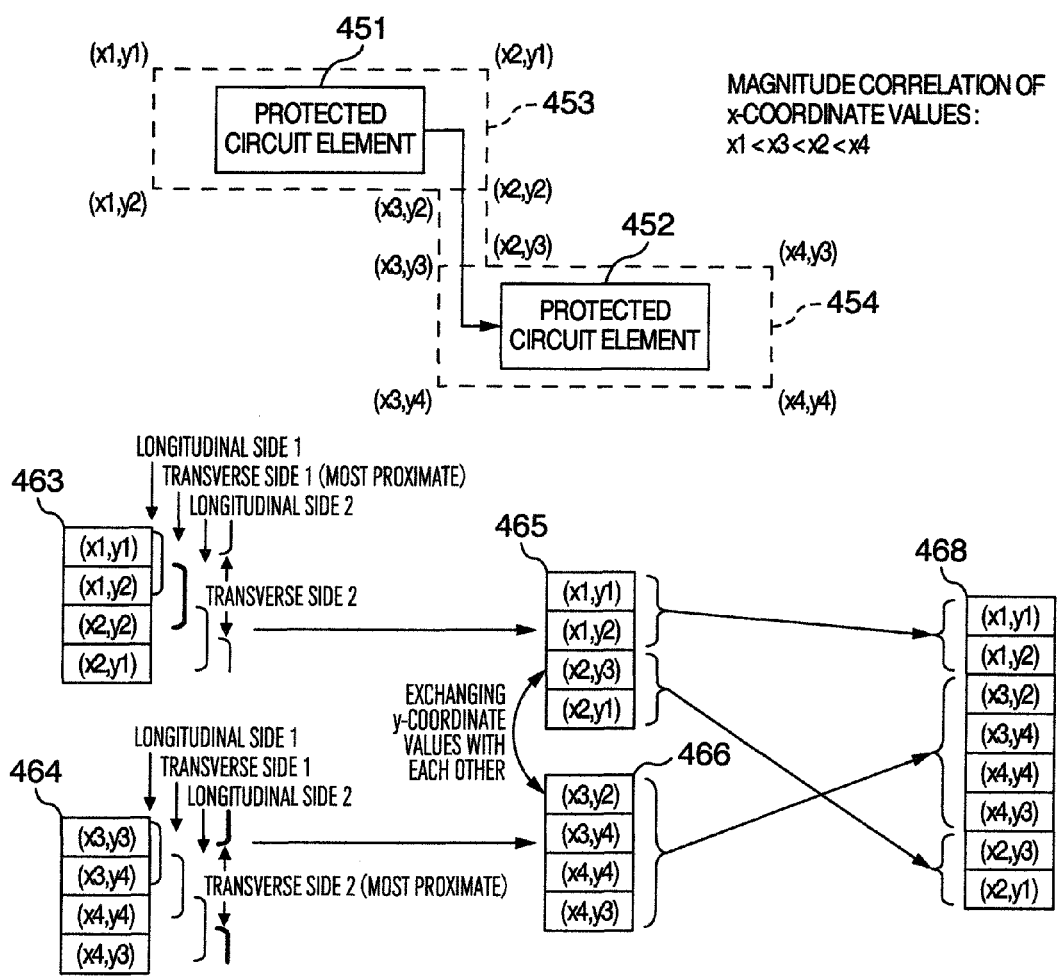
FIG. 10 is a diagram for explaining a method for combining the polygons which represent protected-object areas.

FIG. 10 is a diagram for explaining a method for combining the polygons which represent protected-object areas. A protected-object area 453, which surrounds a protected circuit element 451, is a rectangle whose vertexes are {(x1, y1), (x1, y2), (x2, y2), (x2, y1)}. These coordinate values are stored in an array 463 in this order, thereby representing the protected-object area 453. Also, a protected-object area 454, which surrounds a protected circuit element 452, is a rectangle whose vertexes are {(x3, y3), (x3, y4), (x4, y4), (x4, y3)}. These coordinate values are stored in an array 464 in this order, thereby representing the protected-object area 454. Also, the coordinate values of each array represent sides in an order of a longitudinal side, a transverse side, a longitudinal side, and a transverse side for every two elements of each array. Namely, in the array 463, {(x1, y1), (x1, y2)} represents a longitudinal side 1, {(x1, y2), (x2, y2)} represents a transverse side 1, {(x2, y2), (x2, y1)} represents a longitudinal side 2, and {(x2, y1), (x1, y1)} represents a transverse side 2. It is basically the same in the case of the array 464 as well.

Then, in the two polygons represented by the arrays, by searching for the two sides of the two polygons between which the distance becomes the shortest, it will be found which side of one polygon and which side of the other polygon should become connection objects. However, only the distance between the mutually longitudinal sides or only the distance between the mutually transverse sides is calculated; the distance between a longitudinal side and a transverse side is not calculated. Specifically, the distances between the longitudinal side 1 {(x1, y1), (x1, y2)} of the array 463, and the longitudinal side 1 {(x3, y3), (x3, y4)} and the longitudinal side 2 {(x4, y4), (x4, y3)} of the array 464 are calculated, respectively. Similarly, the distances between the longitudinal side 2 {(x2, y2), (x2, y1)} of the array 463, and the longitudinal side 1 and the longitudinal side 2 of the array 464 are calculated, respectively. Here, all of the sides between which the distance is to be determined are parallel to each other and the distance can easily be determined as the difference between the x coordinates. It is basically the same in the case of the transverse sides as well; the distances between the transverse side 1 {(x1, y2), (x2, y2)} of the array 463, and the transverse side 1 {(x3, y4), (x4, y4)} and the transverse side 2 {(x4, y3), (x3, y3)} of the array 464; and also the distances between the transverse side 2 {(x2, y1), (x1, y1)} of the array 463, and the transverse side 1 and the transverse side 2 of the array 464 are calculated, respectively.

From among the values of the eight distances determined in this way, the minimum value is determined. At this time, however, a combination where the two sides are not mutually opposed to each other is excluded beforehand. Specifically, in a combination of the longitudinal side 2 {(x2, y2), (x2, y1)} of the array 463 and the longitudinal side 1 {(x3, y3), (x3, y4)} of the array 464, these two longitudinal sides are not mutually opposed to each other, and thus are regarded as being out of the connection objects. This is because the relationship is satisfied such that the y-coordinate values (y1 and y2) of the two vertexes of the array 463<the y-coordinate values (y3 and y4) of the two vertexes of the array 464. Calculating the magnitude correlation of the coordinate values of the vertexes makes it possible to judge whether or not this relationship condition holds.

With respect to a combination of the two sides between which the distance becomes the minimum, the positions of the vertexes are transformed. Specifically, it is a combination of the transverse side 1{(x1, y2), (x2, y2)} of the array 463 and the transverse side 2 {(x4, y3), (x3, y3)} of the array 464, which is a combination of the mutually transverse sides. Accordingly, the y-coordinate values of the two vertexes which, in the magnitude correlation of the x-coordinate values, are the second-largest and third-largest values are exchanged with the y-coordinate values on the opposed sides. In this case, the y-coordinate value of the vertex (x3, y3) whose x-coordinate value is the second-largest value and the y-coordinate value of the vertex (x2, y2) whose x-coordinate value is the third-largest value are exchanged with the y-coordinate values on the opposed sides to yield (x3, y2) and (x2, y3), respectively.

Then, the array 463 becomes an array 465 whose vertexes are {(x1, y1), (x1, y2), (x2, y3), (x2, y1)}, and the array 464 becomes an array 466 whose vertexes are {(x3, y2), (x3, y4), (x4, y4), (x4, y3)}.

Next, the two arrays 465 and 466 created as a result of the above-described transformation are combined together, thereby transforming the two polygons to a single polygon. The array which represents this after-transformation polygon is designated as an array 468. First, the comparison is made between the start x-coordinate values of the two polygons which are stored in the first of the two arrays, respectively, and the array whose start x-coordinate value is smaller is stored in the array 468 first. In this case, the first value x1 stored in the array 465 is smaller than the first value x3 stored in the array 466 and the array 465 is stored in the array 468 first. Then, the array 465 is stored therein up to the coordinate values (x1, y2) that is positioned directly before the coordinate values (x2, y3) to which the coordinate transformation has been applied. After that, the array 466 is stored in the array 468 from the first coordinate values (x3, y2). After the array 466 has been stored therein up to the coordinate values (x4, y3), the remaining portion of the array 465 is stored therein from the coordinate values (x2, y3) to create the array 468 which has the eight elements (x1, y1), (x1, y2), (x3, y2), (x3, y4), (x4, y4), (x4, y3), (x2, y3), and (x2, y1).

Up to here, the explanation has been given concerning the case where there exist the two protected-object areas which are at the same protection level. It is, however, also basically the same in the case where there exist plural types of protected-object areas. Explaining this case using FIG. 6, by providing a plurality of arrays substantially equivalent to the array 201, which stores therein the information on elements belonging to protected-object areas, the case where there exist the plural types of protected-object areas can be addressed. In this case, however, the degree of priority is required to be set for each protected-object area. If the output from a low-degree-of-priority element is used for the operation of a high-degree-of-priority element, the protection classification of the array 202 should be updated to the value of the degree of priority of the high-degree-of-priority protected-object area. Regarding visual representation, the method illustrated in the example in FIG. 8 should be applied to the plural types of protected-object areas with different degrees of priority.

Figure 11:
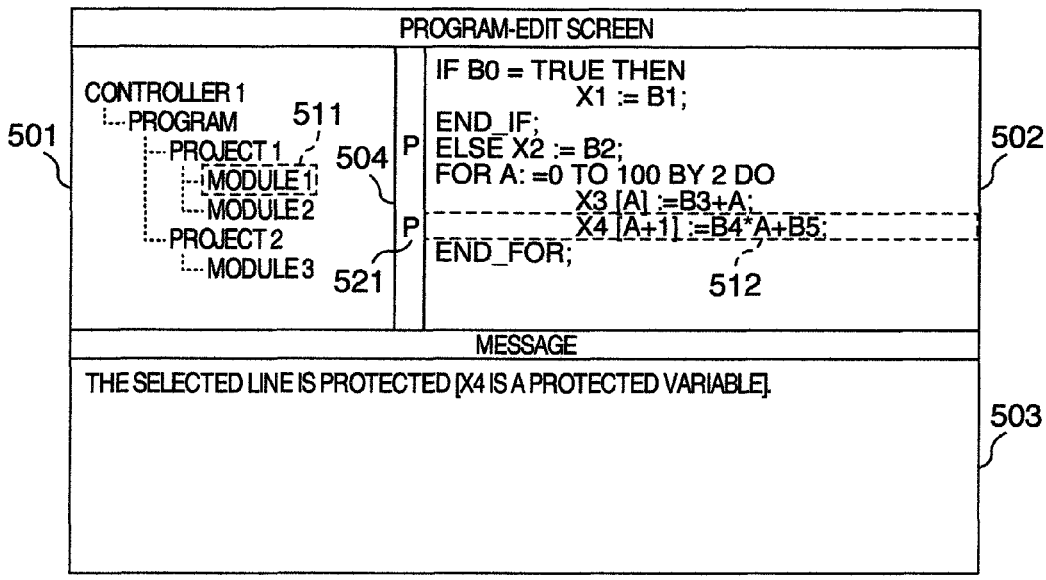
FIG. 11 is a diagram for illustrating a graphical user interface in the case where a program-edit object is described using source codes.

FIG. 11 illustrates a graphical user interface when a program-editing object is described using source codes. A program-hierarchy display screen 501 indicates the directory hierarchy of a program being edited at the moment. Here, a cursor 511 specifies a module 1 included in a project 1 of a controller 1, and thereby information on the program pointed out by the cursor 511 is displayed on a program-edit screen 502. Here, the program-edit screen 502 indicates an example in the IEC61131-3-compliant ST language. At this time, it is assumed that the line in which the editing is underway is, for example, a portion surrounded by a frame 512. It is also assumed that, in this program, there are protected variables X2 and X4 and non-protected normal variables X1 and X3. Then, with respect to calculation operations applied to the protected variables X2 and X4, in order to point out to the user that these are the calculation operations applied to the protected variables, "P" characters indicating being "Protected" are displayed at a position next to the line in which the calculation operations are applied to the protected variables on a protected-state display screen 504 which is to the immediate left to the program-edit screen 502. The character 521 indicates that the calculation operation is being applied to the protected variable X4 in the line indicated by the frame 512 which is to the immediate right to it. Also, when a change is to be added to the calculation operation applied to the protected variable X4, a message such as "The selected line is protected [X4 is a protected variable]." is displayed on a message-display screen 503, which indicates that the editing operation is being applied to a protected portion.

As the display methods, not only the above-described example also other display methods are conceivable. For example, it is conceivable to provide a method of implementing the color-coded display of lines which are in the protected state. Also, even in the case where there are plural numbers of types of the protection, they can be addressed by displaying with different colors.

In this way, by explicitly pointing out protected functions to the user wrong operations can be prevented.

Figure 12:
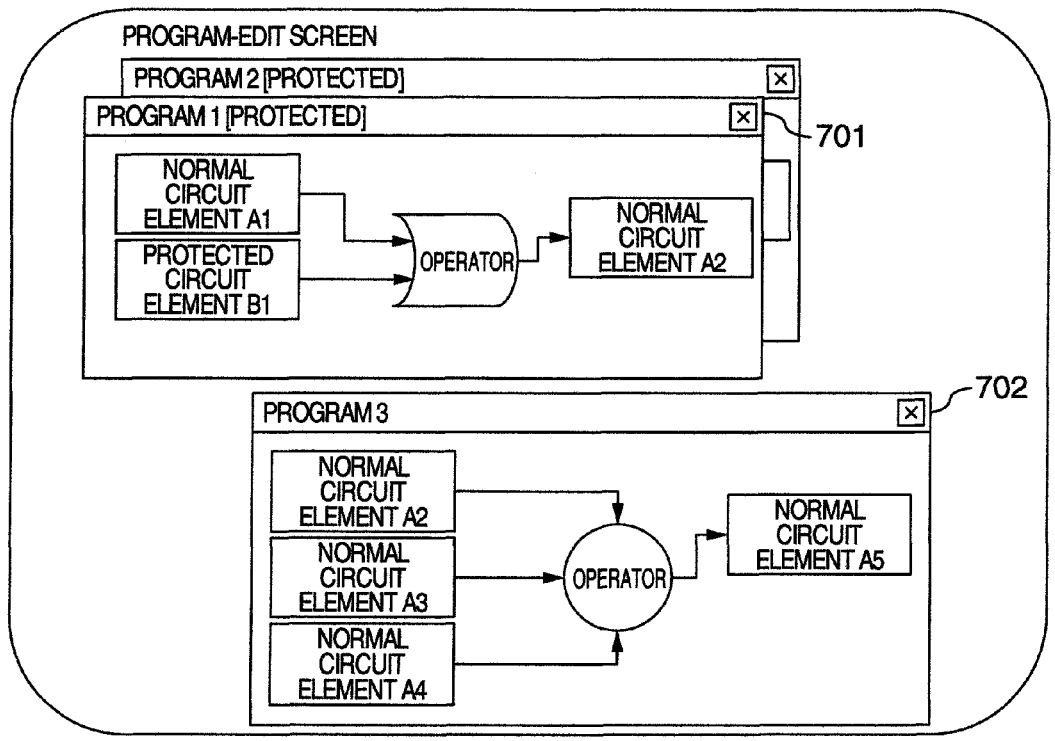
FIG. 12 is a diagram for illustrating a modified example of a layout of the program-edit screen.

FIG. 12 is a diagram for illustrating a modified example of a layout of the program-edit screen illustrated in FIG. 2. In this example, a plurality of small screens (which, hereinafter, will be referred to as "windows") are formed on the screen and the protected or non-protected is set for these windows on each window basis.

In this case, a window 701 includes a protected circuit element B1 in an input/output of its operation. Since the operation associated with the protected circuit element needs to be protected, "protected" is displayed within a title field of the window 701 "program" and indicates to the user that this is in a protected state. Meanwhile, a window 702 includes no protected circuit elements in its operation and the window 702 is not requited to be protected; "protected" is not displayed within a title field of the window 702. Incidentally, even when a circuit element is displayed on a different window, passing data is possible if the same circuit element is defined within the window. For example, a value inputted into a normal circuit element A2 within the window 701 can be extracted as data therefrom if the normal circuit element A2 is defined within the window 702 as well.

Incidentally, a rule for determining whether or not they should become a protected-object area when a protected circuit element and a normal circuit element are connected to each other can be customized, depending on the usage of a circuit element used by the user or the like.

Figure 13:
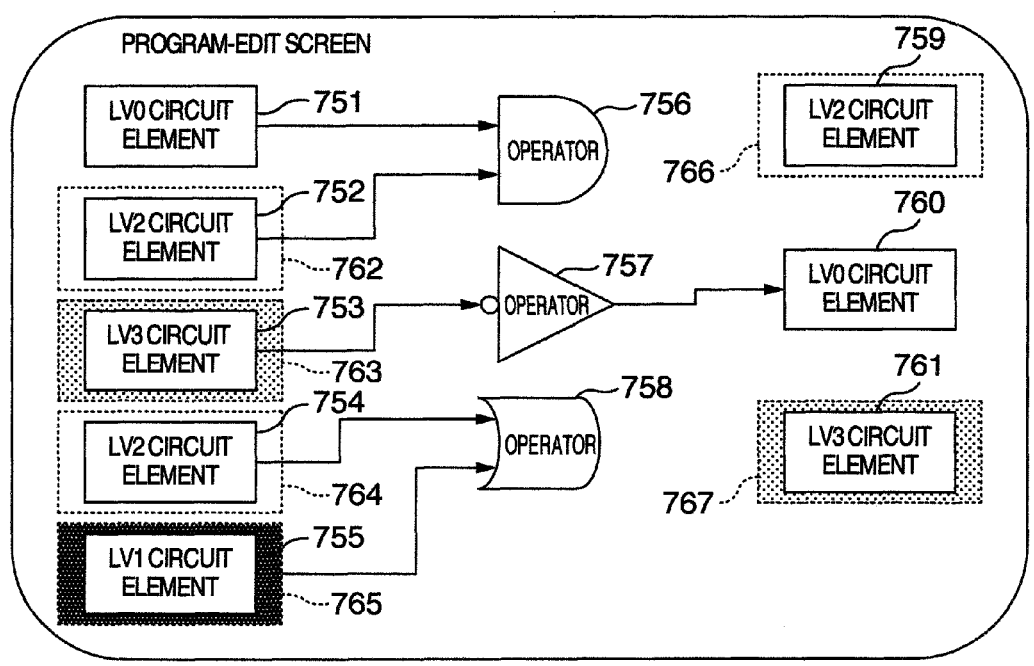
FIG. 13 is a diagram for explaining a layout of the program-edit screen in the case where there are provided a plurality of protection levels.

FIG. 13 is a diagram for explaining a layout of the program-edit screen in the case where programs (circuit elements) are equipped with a plurality of protection levels. In this example, a plurality of levels (LV) are present for the protection and are defined as being LV0 to LV3, respectively. Incidentally, LV0 indicates that it is not protected. The user assigns the respective functions to the respective levels such that, for example, the level 1 is to the control function, the level 2 is to the plant-monitoring function, and the level 3 is to the plant-protecting function. Although the protection is expressed as the levels here, the user himself or herself can also give arbitrary designations to the respective levels.

In the example in FIG. 13, the circuit elements 751 and 760 are at the protection level 0, the circuit element 755 is at the protection level 1, the circuit elements 752, 754, and 759 are at the protection level 2, and the circuit elements 753 and 761 are at the protection level 3. The protection levels of these circuit elements represent the degrees of priority. Namely, the protection level 3 corresponds to the highest degree of priority. Then, the protection level 2, the protection level 1, and the protection level 0 corresponds to the lower degrees of priority in the descending order. The circuit elements at the protection levels 1, 2, and 3 are displayed indicating that they are protected at the respective protection levels.

There exist the frame display 765 for indicating that the circuit element 755 is at the protection level 1, the frame displays 762, 764, and 766 for indicating that the circuit elements 752, 754, and 759 are at the protection level 2, and the frame displays 763 and 767 for indicating that the circuit elements 753 and 761 are at the protection level 3, respectively. An operator 757 performs an operation to the circuit element 753 and substitutes the result into the circuit element 760. This substitution, however, is a substitution into the circuit element at the protection level 0 and no update is conducted to the protection levels concerned; the circuit element 753 remains at the protection level 3 and the circuit element 760 remains at the protection level 0.

FIG. 13 illustrates the state where the editing is underway. From this state, a connection is performed from an operator 756 to the circuit element 759. Also, a connection is performed from an operator 758 to the circuit element 761 as well.

Figure 14:
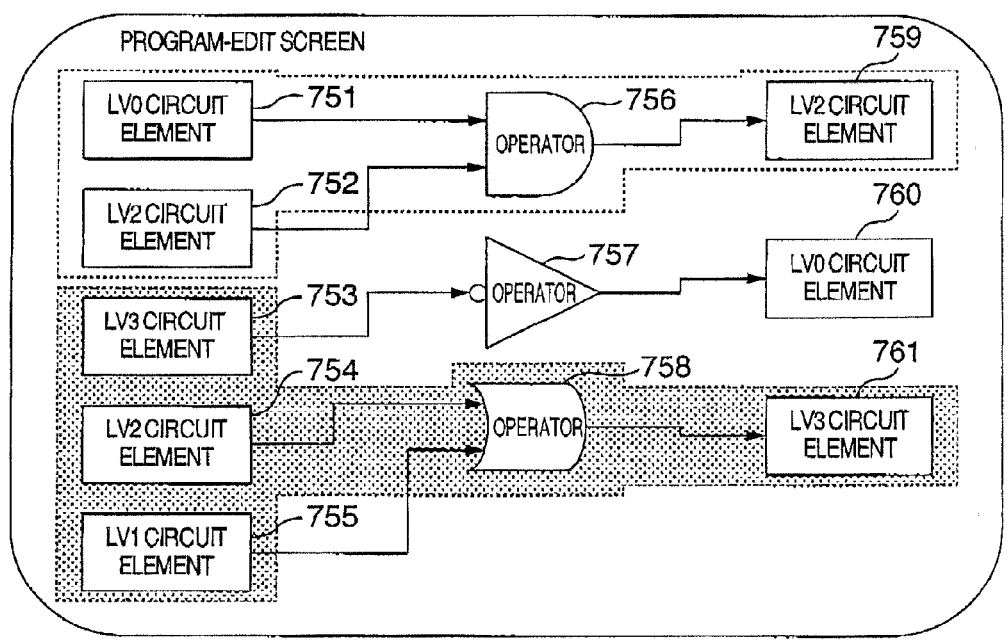
FIG. 14 is a diagram for explaining a layout of the program-edit screen in the case where there are provided the plurality of protection levels.

FIG. 14 illustrates the state where the connection from the operator 756 to the circuit element 759 and the connection from the operator 758 to the circuit element 761 are established. In this case, the degree of priority assigned to each circuit element will be calculated inside.

As a consequence, even though the circuit elements 751 and 752 were at the protection levels 0 and 2, respectively, a relationship for the operator 756 which performs an operation to them to substitute the operation result into the circuit element 759 at the protection level 2 is established and the circuit element 751 is updated to the protection level 2; the protection level of the circuit element 752 remains the unchanged protection level 2. Subsequently, the circuit elements 754 and 755 were at the protection levels 2 and 1, respectively, but, since a relationship for the operator 758 to perform an operation to them and to substitute the operation result into the circuit element 761 at the protection level 3 is established, the circuit elements 754 and 755 are updated to the protection level 3.

Based on this configuration, a part whose protection level is high, that is, which must be dealt with carefully, can be seen easily at a glance by the user on the screen. Therefore, it becomes possible to prevent beforehand the user from erroneously substituting an unauthorized operation result into a high-protection-level circuit element and performing a critical and fatal wrong operation to the plant.

As explained so far, according to the present embodiment, when the program for describing the behavior of a plant control system is downloaded to the control system and is started up, the information inside the control system is read, the read information is checked against the program information stored in the terminal of a user interface, and the utilization classification and protection state of the system are simultaneously displayed on the screen of the user interface for a critical part of the information.

Namely, the use of the visual display measure makes it possible to prevent the occurrence of a wrong operation by the user. Also, it becomes possible to display the utilization classification and protection state on the screen but also to provide authentication function when the screen is operated by the user for the editing of a part of a program for which utilization classification is different or which is in the protected state.

Also, according to the present embodiment, the information indicating what type of operation is permitted to which function of a complex system can be judged by the system and can be reflected on the user interface without being defined by the user himself or herself. This feature makes it possible to suppress the occurrence of a simple, wrong operation by the user. Also, it becomes possible to suppress the occurrence of a serious mistake such that the user grants an erroneous access authentication to another user. Also, since the processing is automatically performed by the system, it is expected that the user's load will become smaller. Also, programs of different operation authorizations can be displayed on a single screen with the operation authorizations explicitly pointed out. Accordingly, it becomes possible to reduce the number of transition movements of the screen as compared with the case where the programs of different operation authorizations are displayed on different screens and the convenience can be enhanced.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A control-system maintenance tool, comprising a program editor which:
reads element data for representing circuit elements and operators and attribute values of said element data from data storages, said circuit elements and said operators being components of sequential programs which constitute functions of said control system;
creates a program-edit screen for said control system based on said read element data;
edits said element data on said created program-edit screen in accordance with an editing input from an input device; and
comprises a judgment function of judging whether said element data for representing said circuit elements and said operators is protected-function data or non-protected-function data,
said control-system maintenance tool
displaying assembly sets of a plurality of said circuit elements, operators whose inputs are outputs from these circuit elements, and circuit elements whose inputs are outputs from these operators on said program-edit screen; and
displaying assembly sets of programs constituted by circuit elements and operators to which accesses are authenticated for implementing a predetermined function on said program-edit screen in a display mode different from display modes of other assembly sets;

wherein said assembly sets of said programs constituted by said circuit elements and said operators to which said accesses are authenticated are displayed on one and the same screen of a display device in said display mode different from said display modes of said other assembly sets;

once an element data is edited, other element data which would affect circuit elements to which accesses are authenticated are searched for and all the affecting circuits are displayed as protected objects.

2. The control-system maintenance tool according to claim 1, wherein access authorizations are settable for said assembly sets of said programs, said access authorizations being different from each other on each assembly-set basis.

3. The control-system maintenance tool according to claim 1, wherein degrees of priority are allocated to access authorizations, said degrees of priority indicating an accessible extent on each assembly-set basis, and when a program belonging to a certain assembly set falls into an input relationship or output relationship with a program belonging to another assembly set whose degree of priority is equal to or higher than said degree of priority of said certain assembly set, a notification is issued to a user while an operation for implementing said input relationship or said output relationship is underway, said notification indicating that said operation is performed to said program belonging to said assembly set whose degree of priority is higher.

4. The control-system maintenance tool according to claim 3, wherein degrees of priority are allocated to access authorizations, said degrees of priority indicating an accessible extent on each assembly-set basis, and, when a first program belonging to a first assembly set becomes an input into a second program belonging to a second assembly set whose degree of priority is equal to or higher than said degree of priority of said first assembly set, said first program is changed so that said first program belongs to an assembly set whose degree of priority is equal to said second program after an operation for implementing said input relationship is performed.

5. The control-system maintenance tool according to claim 1, wherein degrees of priority are allocated to access authorizations, said degrees of priority indicating an accessible extent on each assembly-set basis, and said input device being equipped with a function for denying an input from a user who does not have an authorization corresponding to said degree of priority.

6. The control-system maintenance tool according to claim 1, wherein degrees of priority are allocated to access authorizations, said degrees of priority indicating an accessible extent on each assembly-set basis, and said input device being equipped with a function for displaying a warning against an input from a user who does not have an authorization corresponding to said degree of priority.

7. The control-system maintenance tool according to claim 1, wherein degrees of priority are allocated to access authorizations, said degrees of priority indicating an accessible extent on each assembly-set basis, and said input device being equipped with a function for displaying a screen for requesting authentication of an operation authorization against an input from a user who does not have said authorization corresponding to said degree of priority.

8. A program-editing device, comprising a program editor which:

reads element data for representing circuit elements and operators and attribute values of said element data from data storages, said circuit elements and said operators being components of sequential programs which constitute functions of said control system;

creates a program-edit screen for said control system based on said read element data;

edits said element data on said created program-edit screen in accordance with an editing input from an input device; and comprises a judgment function of judging whether said element data for representing said circuit elements and said operators is protected-function data or non-protected-function data, said program editing device displaying assembly sets of a plurality of said circuit elements, operators whose inputs are outputs from these circuit elements, and circuit elements whose inputs are outputs from these operators on said program-edit screen; and displaying assembly sets of programs constituted by circuit elements and operators to which accesses are authenticated for implementing a predetermined function on said program-edit screen in a display mode different from display modes of other assembly sets;

wherein said assembly sets of said programs constituted by said circuit elements and said operators to which said accesses are authenticated are displayed on one and the same screen of a display device in said display mode different from said display modes of said other assembly sets;

once an element data is edited, other element data which would affect circuit elements to which accesses are authenticated are searched for and all the affecting circuits are displayed as protected objects.

9. A program-editing method, to be used in a program-editing device, which comprises a program editor which reads element data for representing circuit elements and operators and attribute values of said element data from data storages, said circuit elements and said operators being components of sequential programs which constitute functions of said control system;

creates a program-edit screen for said control system based on said read element data;

edits said element data on said created program-edit screen in accordance with an editing input from an input device; and comprises a judgment function of judging whether said element data for representing said circuit elements and said operators is protected-function data or non-protected-function data, said program-editing device displaying assembly sets of a plurality of said circuit elements, operators whose inputs are outputs from these circuit elements, and circuit elements whose inputs are outputs from these operators on said program-edit screen; and displaying assembly sets of programs constituted by circuit elements and operators to which accesses are authenticated for implementing a predetermined function on said program-edit screen in a display mode different from display modes of other assembly sets;

said program-editing method, comprising the steps of:

allocating degrees of priority to access authorizations, said degrees of priority indicating an accessible extent on each assembly-set basis; and, when a first program belonging to a first assembly set becomes an input into a second program belonging to a second assembly set whose degree of priority is equal to or higher than said degree of priority of said first assembly set, changing said first program so that said first program belongs to an assembly set whose degree of priority is equal to said second program after an operation for implementing said input relationship is performed;

wherein said assembly sets of said programs constituted by said circuit elements and said operators to which said accesses are authenticated are displayed on one and the same screen of a display device in said display mode different from said display modes of said other assembly sets;

once an element data is edited, other element data which would affect circuit elements to which accesses are authenticated are searched for and all the affecting circuits are displayed as protected objects.

* * * * *